United States Patent [19]
Morrison

[11] Patent Number: 5,992,553
[45] Date of Patent: Nov. 30, 1999

[54] PEDAL POWER SENSOR AND HUMAN POWERED VEHICLE DRIVE AUGMENTATION RESPONSIVE TO CYCLIC PEDAL POWER INPUT

[76] Inventor: Thomas R. Morrison, 145 N. Fifth Ave., Mount Vernon, N.Y. 10550

[21] Appl. No.: 08/785,172

[22] Filed: Jan. 13, 1997

[51] Int. Cl.$^6$ ................................................. B62K 11/00
[52] U.S. Cl. ......................... 180/206; 180/205; 180/220; 180/221
[58] Field of Search ..................... 180/220, 221, 180/342, 205, 206, 65.2, 65.1, 65.8; 74/594.4

[56] References Cited

U.S. PATENT DOCUMENTS

| | | | |
|---|---|---|---|
| 4,364,448 | 12/1982 | Ikuma | 180/206 |
| 4,423,630 | 1/1984 | Morrison | 73/379 |
| 4,526,036 | 7/1985 | Morrison | 73/493 |
| 4,552,088 | 11/1985 | Morrison | 116/28.1 |
| 5,024,286 | 6/1991 | Lean et al. | 180/65.2 |
| 5,065,320 | 11/1991 | Hayashi et al. | 180/65.8 |
| 5,370,200 | 12/1994 | Takata | 180/65.2 |
| 5,375,676 | 12/1994 | Takata et al. | 180/65.2 |
| 5,474,148 | 12/1995 | Takata | 180/65.2 |
| 5,505,277 | 4/1996 | Suganuma et al. | 180/206 |
| 5,664,636 | 9/1997 | Ikuma et al. | 180/220 |
| 5,777,442 | 7/1998 | Miyata | 180/206 |

FOREIGN PATENT DOCUMENTS

| | | | |
|---|---|---|---|
| 4-100790 | 4/1992 | Japan | 180/220 |
| 5-50977 | 3/1993 | Japan | 180/220 |
| 5-310177 | 11/1993 | Japan | 180/220 |

*Primary Examiner*—Daniel G. DePumpo
*Attorney, Agent, or Firm*—Thomas R. Morrison

[57] ABSTRACT

A human-powered vehicle power augmentation system produces a signal variable in response to applied force. The signal, transmitted to a control system, produces a motor-control signal which adds boost power to the human input in proportion to the amount by which the human input exceeds a predetermined threshold value. Below the threshold value, vehicle drive power is derived solely from the human input. Above the threshold value, boost power is added to the human input in proportion to the amount by which the applied force exceeds the threshold value. In one embodiment of the invention, a boost threshold control establishes the amount of human input above which boost is applied, while a boost max control establishes a slope of boost augmentation above the boost threshold. When the amount of boost applied approaches or reaches the maximum that is available, a shift indicator is actuated to inform the rider that the time has come to shift to a lower gear. In the preferred embodiment, one or both pedals of a pedal-powered vehicle include a force sensor which controls a force-dependent pulse-repetition frequency, pulse width or carrier frequency of a radio, or other, signal which is transmitted to a receiver stationarily mounted on the vehicle. The received signal controls the amount of boost applied. A cadence indicator may be included to assist the rider in gear management.

8 Claims, 9 Drawing Sheets

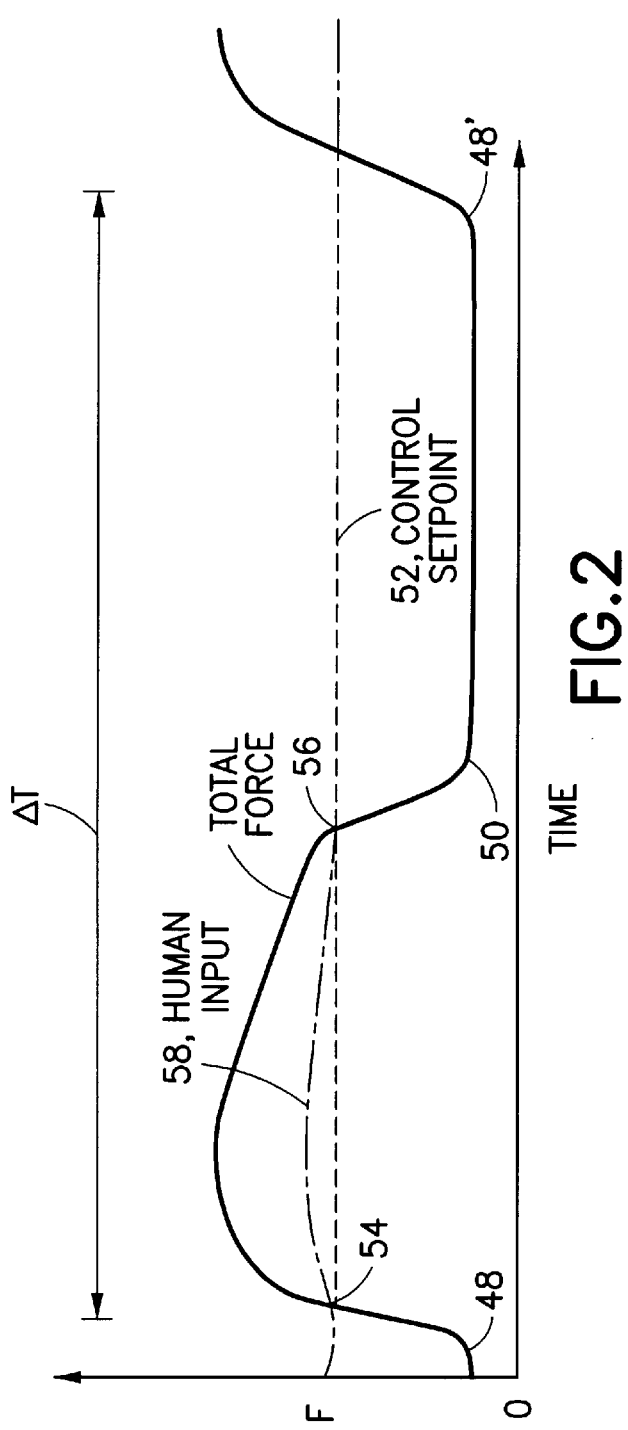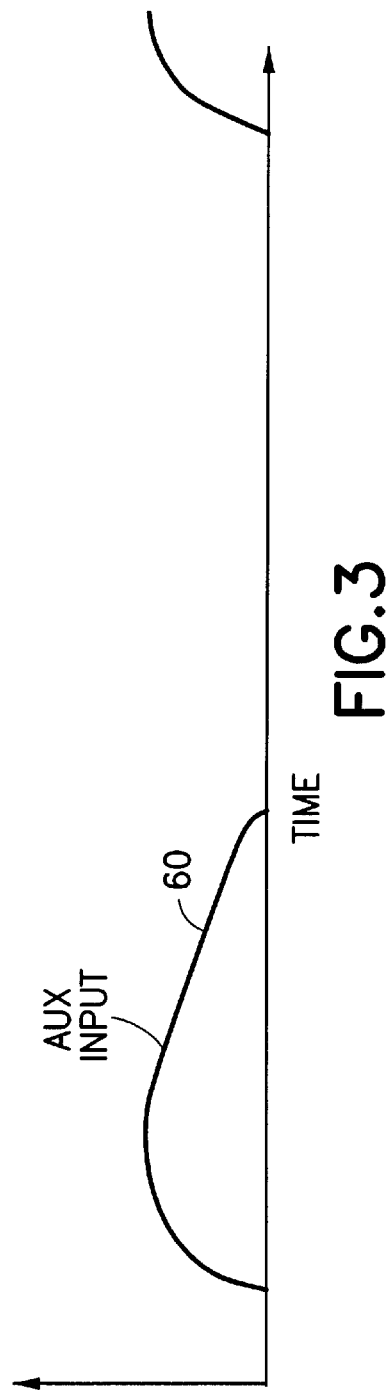

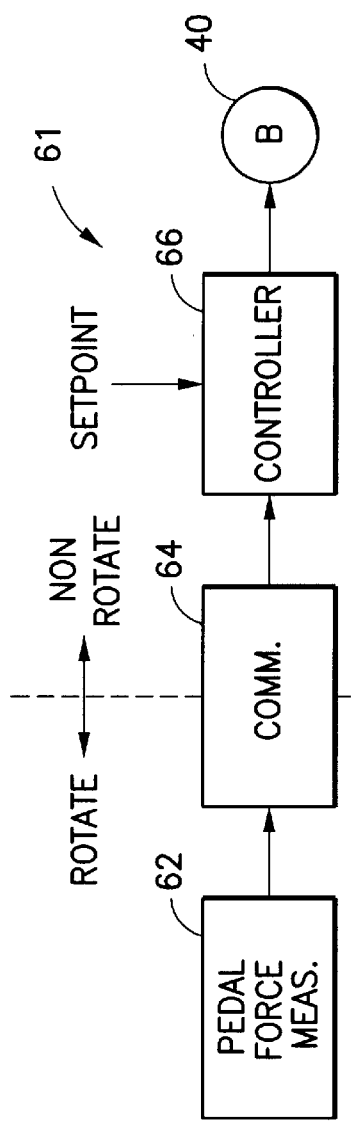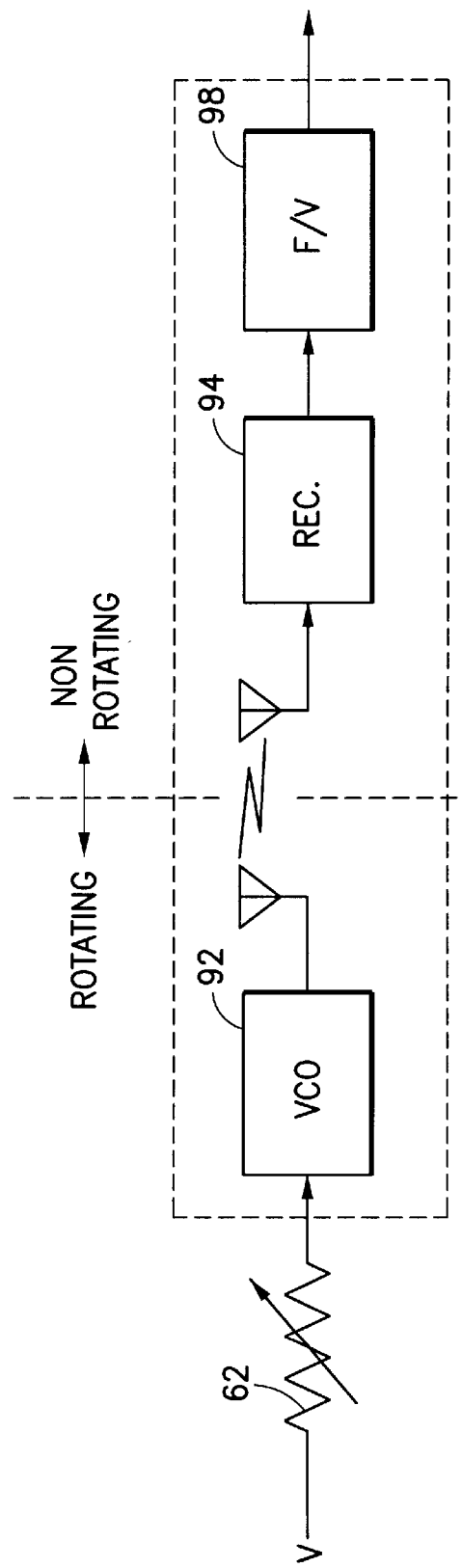

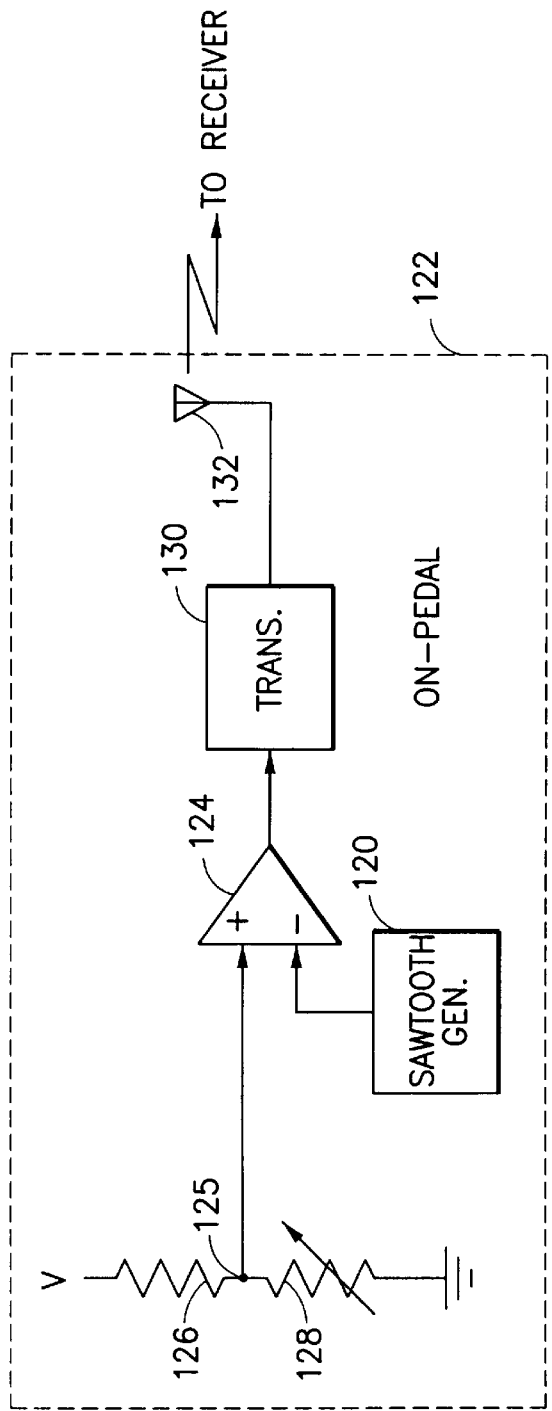
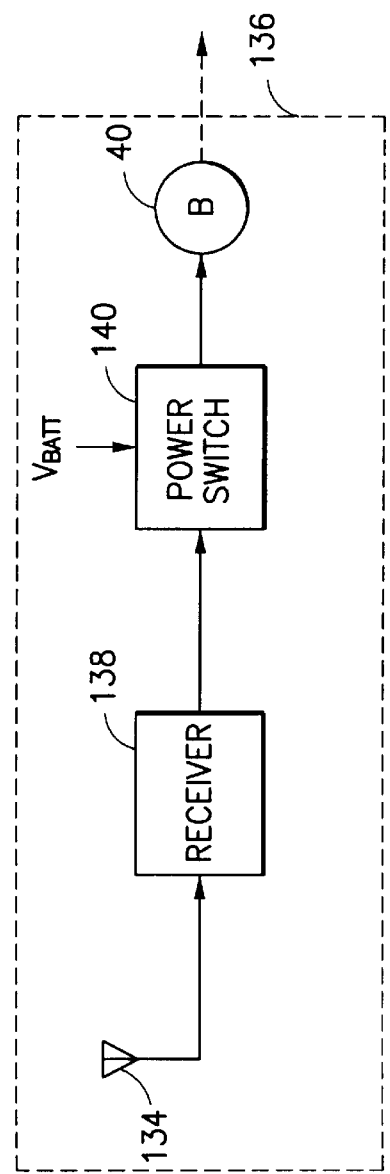
FIG.11A
FIG.11B

PEDAL POWER SENSOR AND HUMAN POWERED VEHICLE DRIVE AUGMENTATION RESPONSIVE TO CYCLIC PEDAL POWER INPUT

BACKGROUND OF THE INVENTION

Human powered vehicles suffer from the limited output power available from the human limbs. A typical healthy adult human is capable of producing about 100 to about 150 watts for periods of an hour or more. Trained athletes are capable of producing about 250 watts (0.15 horsepower) for long periods and about 750 watts (1 horsepower) for short periods. An adult human in poor condition is capable of producing only about 50 watts.

For convenience in the following description, the term bicyclist will be used in a general sense to refer to any human powered activity in which a vehicle is driven by human muscle power. Besides bicycles and tricycles, this can also include rowed boats and human-powered aircraft.

For comfortable pedaling of a bicycle or tricycle over a substantial period of time, a sustainable power output must be maintained. Power output is related to pedal force and pedal cadence (number of pedal strokes per minute). A suitable balance between pedal force and cadence is required. If the pedal force applied is too high, the legs of the pedaler become tired quickly. If the pedaling cadence is too high, the pedaler runs out of breath in a short time. Accommodation to the required compromise of power output, pedal force and cadence is found on most touring bicycles and tricycles in the form of a gearshift mechanism. The gearshift mechanism, either internal to the driven wheel (for example, a Sturmy Archer type) or in the drive train from the pedal crank to the driven wheel (for example, the derailleur type), varies the distance of forward travel achieved for each rotation of the pedal crank. The number of rotations of the driven wheel per rotation of the pedal crank is known as the inverse gear ratio.

The strategy adopted by most bicyclists for maintaining the desired balance basically consists of applying a comfortable pedal force and adjusting the gear ratio until an approximation of a target cadence is attained. That is, the bicyclist selects a gear, continues to apply a comfortable pedal force, and determines whether a desirable range of cadence results. If the resulting cadence is too high, the bicyclist shifts gears to select a higher gear ratio—if it too low, the bicyclist selects a lower gear ratio.

For a given speed, the power output is that required to balance the following factors:
  rolling friction with the road,
  drive train friction,
  wind drag,
  slope of road,
  weight of rider Of these factors, rolling friction and drive train losses are substantially constant. In normal bicycle operation, wind drag is a significant variable because headwind and tailwind add or subtract from the relative wind produced by vehicle motion. The dominating variables, though, are slope and the weight of vehicle and rider, since an up slope requires the raising of the vehicle and rider from the lowest to the highest point on the slope.

In my prior U. S. Pat. No. 4,552,088, I disclose an inclinometer in which the up-slope angle of the road being traveled is calibrated in terms of the gear of a 10-speed bicycle which should be selected. Tests reported in this patent show that, for moderate pedaling with a 10-speed bicycle, a suitable cadence of about 55 strokes per minute could be maintained to an up-slope angle of about 1.8 degrees with very light pedal pressure. At this up-slope, the gearshift has reached the lowest gear at which the inverse gear ratio (the number of rear-wheel rotations per rotation of the drive sprocket) is about 1.75. At greater up slopes, some combination of additional pedal force and reduced cadence must be sustained in order to maintain headway. This disclosure uses headwind speed as a parameter. This patent discloses the use of a pendant weight driving a variable resistor to produce an electrical signal responsive to slope. The slope signal is used to produce a slope indication on a slope meter which guide the selection of a gear. Disturbances in the output signal due to road irregularities and pedal acceleration pulses are treated as noise, and are filtered out, either electrically or mechanically.

My prior patent, and the remainder of the prior art is silent about a solution, except for motor drive, when the slope increases to a value at which the bicyclist is using the lowest possible gear, the cadence has slowed to a very low value, and the muscle power produced by the bicyclist cannot be increased sufficiently to maintain a target cadence, or even to continue riding (the picture of a bicyclist off the bicycle, pushing the vehicle up a hill, is all too common).

My prior U.S. Pat. No. 4,526,036 discloses a technique for detecting a pedaling cadence of a bicycle. A lightly restrained weight, rotatable about a vertical axis, is displaced forward and backward by accelerations and decelerations of successive pedal pulses. An electronic circuit provides an indication of the cadence for the guidance of the bicycle rider.

My prior U.S. Pat. No. 4,423,630 discloses a cyclic power monitor which uses a pressure sensor on one pedal of a bicycle. The measured pedal force, together with the pedaling cadence detected from variations in the pedal force applied to the pressure sensor, drive indicators indicating cadence, pedal force, and power output. Slope is not derived in this disclosure.

Auxiliary power for bicycles has been a consistent aim to enable comfortable bicycle travel, including travel routes containing uphill portions too steep for traverse at a comfortable power output level. This aim has been thwarted by the noise and pollution of small attachable fossil-fueled motors, and by the limited power storage capacity of batteries.

A battery assist for a bicycle commonly consists of a small electric motor controlled by an ON-OFF switch. This device has two main drawbacks. First, a bicycle rider tends to turn on the battery assist during times that it is not needed, thereby reducing battery endurance. Secondly, this device permits addition of auxiliary power during downhill travel. Auxiliary power during downhill travel is well-known to drive a bicycle to dangerously high speeds.

It would be convenient, but presently unattainable in a convenient manner, to measure the output power actually produced, and then to add auxiliary power only when the rider's output exceeds a preset comfortable output power. In this manner, the rider output power would remain the principal power source for the vehicle, but the exertion would remain within a range which would permit long rider endurance, but would use only the minimum amount of stored battery energy actually required for this augmentation.

Several practical difficulties have so far prevented the introduction of such a system. Of particular difficulty is the measurement of pedal force exerted on a relatively moving pedal, and the generation and application of auxiliary power at a relatively non-moving part of the bicycle.

OBJECTS AND SUMMARY OF THE INVENTION

It is an object of the invention to provide a power augmentation device for a human powered vehicle which permits the human to maintain a desired maximum power output under varying conditions of load, wind and slope, some combinations of which may otherwise require the exertion of power output in excess of the desired maximum power output.

It is a further object of the invention to provide a power augmentation device for a human powered vehicle which applies auxiliary driving power at a rate permitting the human to maintain a desired power output.

It is a still further object of the invention to provide a force measurement device, capable of being affixed to the pedal of a bicycle, and including a transmitter for transmitting a signal related to the pedal force exerted on the pedal to a non-rotating location on the bicycle.

It is a still further object of the invention to provide a system which includes a device for measuring a cyclic pedal force applied to a pedal of a bicycle, a transmitter for transmitting a signal which varies according to the sensed pedal force, a receiver in a non-rotating location on the bicycle, a controller for producing a power augmentation control signal in response to the sensed pedal force and the cadence of the sensed pedal force, a power controller responsive to the control signal, and a motor coupled to augment the rider's power input only when such augmentation is required.

Briefly stated, there is provided a human-powered vehicle power augmentation system which produces a signal variable in response to applied force. The signal, transmitted to a control system, produces a motor-control signal which adds boost power to the human input in proportion to the amount by which the human input exceeds a predetermined threshold value. Below the threshold value, vehicle drive power is derived solely from the human input. Above the threshold value, boost power is added to the human input in proportion to the amount by which the applied force exceeds the threshold value. In one embodiment of the invention, a boost threshold control establishes the amount of human input above which boost is applied, while a boost max control establishes a slope of boost augmentation above the boost threshold. When the amount of boost applied approaches or reaches the maximum that is available, a shift indicator is actuated to inform the rider that the time has come to shift to a lower gear. In the preferred embodiment, one or both pedals of a pedal-powered vehicle include a force sensor which controls a force-dependent pulse-repetition frequency, pulse width or carrier frequency of a radio, or other, signal which is transmitted to a receiver stationarily mounted on the vehicle. The received signal controls the amount of boost applied. A cadence indicator may be included to assist the rider in gear management.

According to an embodiment of the invention, there is provided a power augmentation system for a human driven cyclically powered device comprising: means for sensing a force applied to a driving element, means for producing a signal having a characteristic responsive to a magnitude of the force, a control system, a motor, means in the control system responsive to the signal for applying a drive signal to the motor in response to the force exceeding a predetermined threshold, and further means in the control system for increasing the drive signal in proportion to an amount by which the force exceeds the predetermined threshold.

According to a feature of the invention, there is provided a power augmentation system for a pedal-powered vehicle, comprising: means for generating a force-dependent signal having a variable characteristic responsive to a pedal force applied to at least one pedal of the vehicle, a control system, the control system including means for producing a motor-control signal in response to the force-dependent signal, the motor-control signal being adapted for applying a variable amount of electric power to a motor, the variable amount being related to the variable characteristic, means for setting a lower threshold below which the variable characteristic is ineffective for applying the electric power to the motor, and means for controlling a slope of the variable amount above the lower threshold, whereby the variable amount is a boost power proportional related to an amount by which the pedal force exceeds a value sufficient to achieve the lower threshold.

According to a further feature of the invention, there is provided a power augmentation system for a pedal-powered vehicle comprising: a force-variable element on at least one pedal of the vehicle, the force-variable element being positioned to be contacted by a foot of a rider of the vehicle during pedaling, means on the pedal for producing a signal in response to a pedal force applied by the foot to the force-variable element, means for transmitting the signal to receiver on a non-rotating portion of the vehicle, a drive motor, and means for applying a motor drive power to the motor in proportion to the signal received by the receiver.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a graph to which reference will be made in describing the relationship pedal force input required both with, and without, the present invention.

FIG. 3 is a graph illustrating the power augmentation required to limit the pedal force as illustrated in FIG. 2.

FIG. 4 is a simplified block diagram of a power augmentation system according to an embodiment of the invention.

FIG. 6 is a schematic and block diagram of a further embodiment of a control system according to an embodiment of the invention.

FIG. 11A is a block and schematic diagram of on-pedal components according to a further embodiment of the invention.

FIG. 11B is a block and schematic diagram of off-pedal components useful with the embodiment of FIG. 11A.

DETAILED DESCRIPTION OF THE PREFERRED EMBODIMENT

When riding a multi-speed bicycle as described above, as the up-slope increases, the bicyclist selects lower and lower gear ratios until a comfortable pedal force produces a comfortable cadence. This results in an efficient power output which can be maintained for a substantial time. However, when the slope increases to the point where even the lowest selectable gear does not produce the desired combination of drive parameters, the pedal cadence decreases and/or the pedal force increases beyond comfortable and sustainable values.

Figure 1:
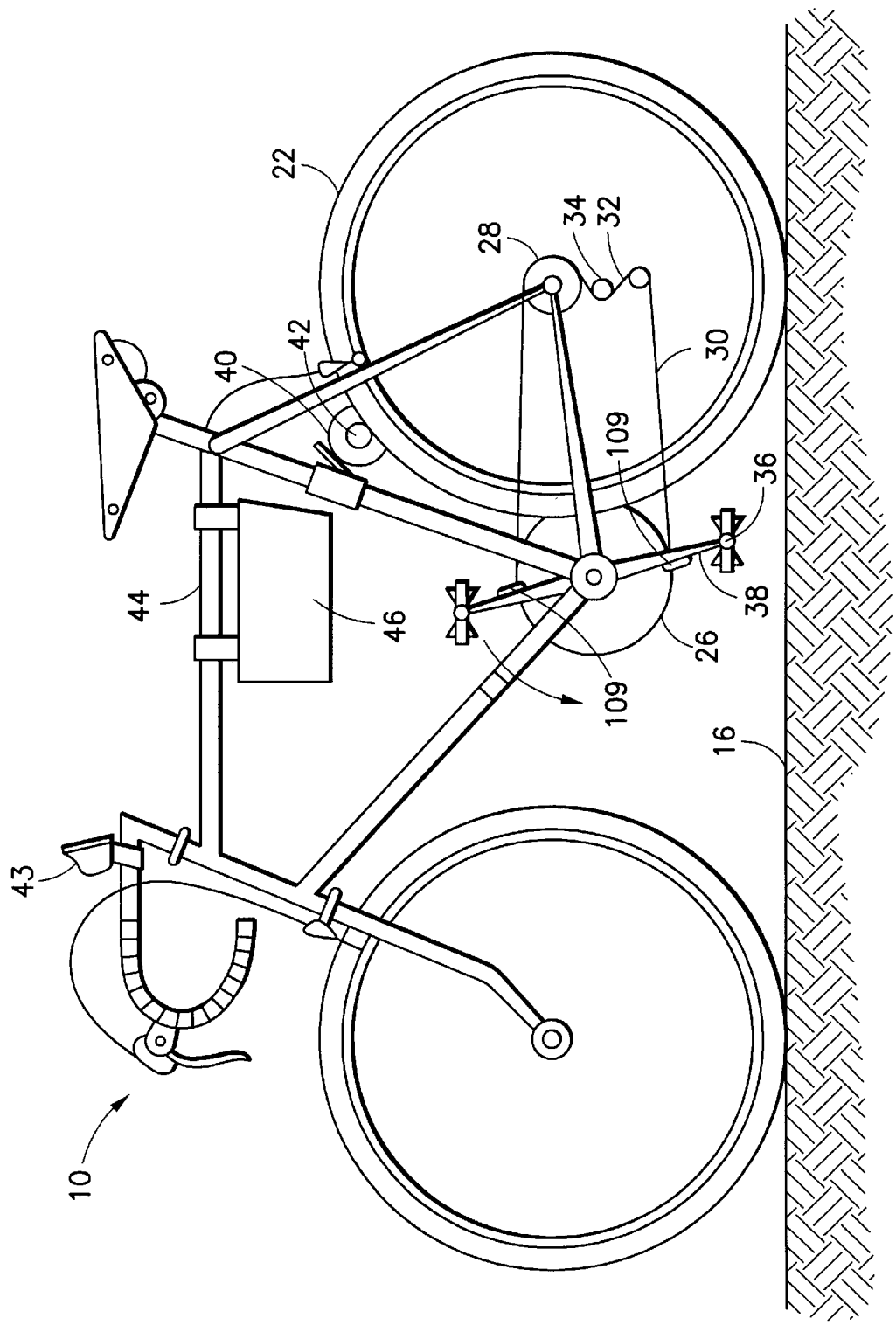
FIG. 1 is a side view of a bicycle including a sensing and control system according to an embodiment of the invention.

Referring now to FIG. 1, there is shown, generally at 10, a multi-speed bicycle resting on a surface 16. Bicycle 10 is conventionally driven using a pair of pedals 36 coupled by a pedal crank to one or more front sprockets 26. Front sprocket 26 is connected by a conventional bicycle chain 30 to a cluster of rear sprockets 28 using a derailleur gear shift 32. Multi-speed bicycles with derailleur gear shifts are frequently referred to as 10-speed bicycles. Ten selectable speeds are attained by two sprockets connected to the pedal crank, and five sprockets connected to the rear wheel. Some bicycles use six rear-wheel sprockets with two pedalcrank sprockets, for a total of 12 selectable speeds. Other bicycles use three front sprockets with five or six rear sprockets. The exact number of speeds is immaterial to the present disclosure. In addition, the type of variable-ratio transmission is not important to the invention. In fact, the present invention is equally applicable to a single-speed bicycle, i.e. one with only a single gear ratio.

The pedaling force required to drive bicycle 10 for constant cadence, or constant power output is:

$$P.F. = R_R + R_W + R_G, \text{ where:}$$

$R_R$=rolling resistance, $R_W$=wind resistance $R_G$=W.L. tan theta where

L=distance per unit time

W=weight of vehicle and rider theta=slope of surface 16 with respect to horizontal Although limiting power output of a bicycle rider is, in general, desirable to avoid fatigue, of a more immediate concern is limiting the maximum amount of pedal force which the bicycle rider applies to the pedals of the bicycle.

A force-measurement device, to be described later, communicates a signal related to the pedal force or power being exerted, either in real time, or on a cyclic basis to a controller 46 supported on a non-rotating portion of bicycle 10. Controller 46 includes a battery and a control circuit. Controller 46 produces an output signal for application to a drive motor 40. Drive motor 40 applies an appropriate amount of torque through a drive wheel 42 to a rear wheel 22 of bicycle 10.

Referring now to FIG. 2, the force exerted on one of pedals 36 is seen to be cyclic, with most of the pedal force being exerted during the downstroke between points 48 and 50. Assuming that the desired pedal force threshold is identified by a control setpoint line 52, it is seen that the required pedal force exceeds the desired pedal force threshold 52 between points 54 and 56. It is the object of the invention to limit the amount by which the human input is required to exceed the threshold 52. As illustrated in dash-dot human-input line 58, the human input is limited to a very small amount above threshold 52 by the application of auxiliary power.

Referring now to FIG. 3, an auxiliary force input 60 (motor torque at drive wheel 42, translated through gearing to an assist at pedals 36) is applied between points 54 and 56 to maintain the required human input close to threshold 52 in FIG. 2.

Referring now to FIG. 4, a control system 61 for controlling auxiliary power to a bicycle includes a pedal force measurement 62 which produces a signal related to the force applied to a bicycle pedal by a cyclist. In the preferred embodiment, pedal force applied to both pedals is accounted for. However, for purposes of description, the process for measuring pedal force applied to one pedal, and for generating the desired power augmentation, is detailed. One skilled in the art would have no difficulty in applying the same principles to pedal forces applied to a pair of pedals. The pedal force signal is communication through a communications device 64 to a controller 66. Besides the pedal force signal, controller 66 also receives, contains or calculates a setpoint for setting control setpoint 52. In response to its inputs, controller 66 applies a signal to drive motor 40.

The manner in which pedal force measurement 62 detects pedal force may vary from application to application. In one embodiment, the deflection of chain 30 during pedaling is measured, preferably by an optical sensor. In another embodiment, the tube through which pedal crank 38 extends horizontally between the two pedals 36 contains a load cell (not shown). The signal from the load cell is a crude measure of the amount of pedal force being exerted at any time. In the preferred embodiment, pedal force measurement 62 takes place on pedal 36 in a manner to be described.

The nature of communications device 64 depends on the type and location of pedal force measurement 62. If pedal force measurement 62 is located on a non-rotating portion of bicycle 10, communications device 64 may be wires between pedal force measurement 62 and controller 66. In the preferred embodiment, pedal force measurement 62 is disposed on, and rotates with, pedal 36. Thus, hard wiring is not required.

Figure 5:
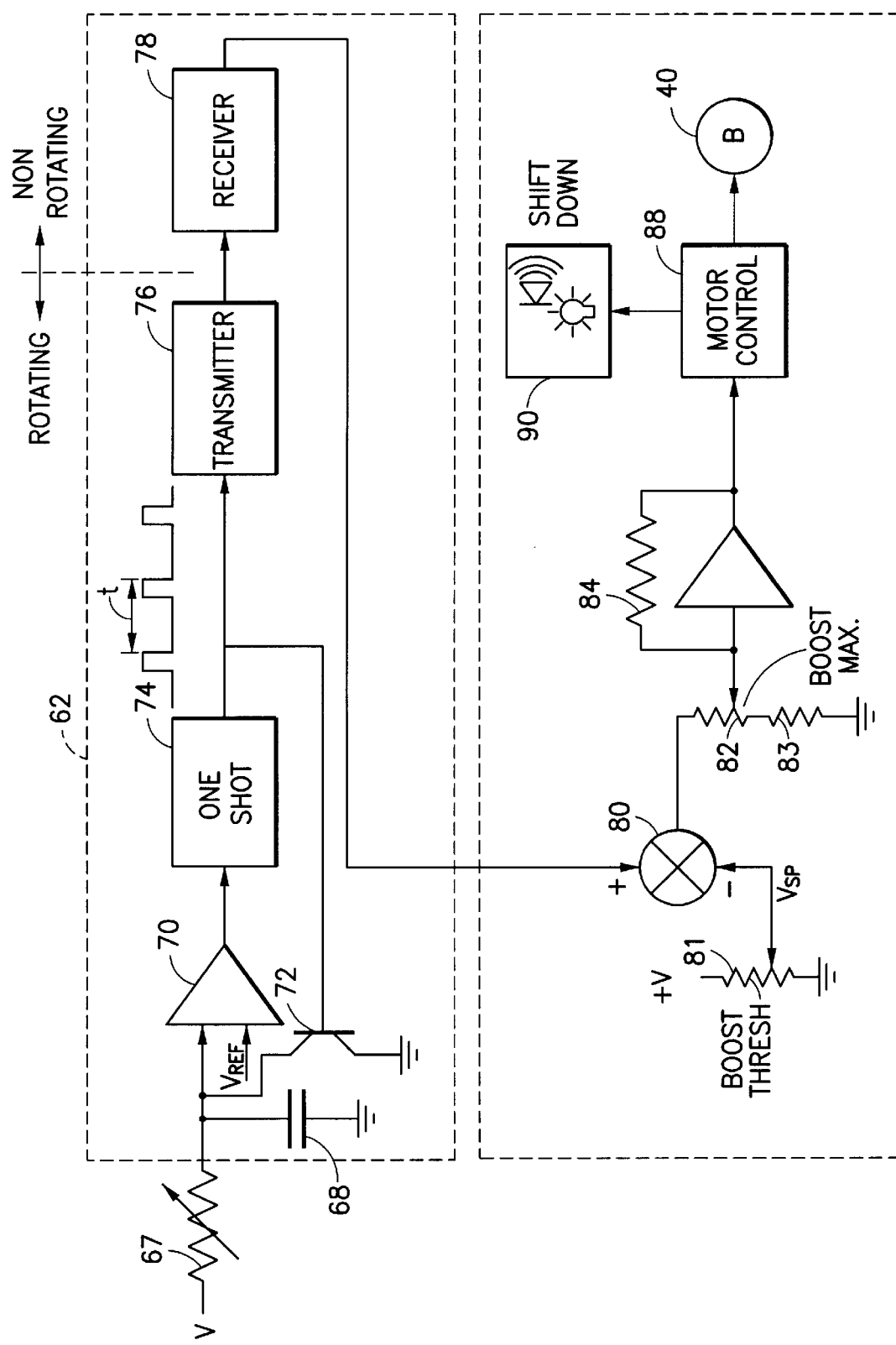
FIG. 5 is a schematic and block diagram of a control system according to an embodiment of the invention.

Referring now to FIG. 5, the primary input device to pedal force measurement 62 is preferably a force-variable resistor 67 whose resistance varies inversely with the compression thereof resulting from forces applied thereto. Such force-variable resistors are well known in the art. In their simplest embodiment, force-variable resistors consist of graphite-doped rubber or suitable polymer.

A voltage V, is applied through force-variable resistor 67 to a junction of a capacitor 68 and one input of a comparator 70. A reference voltage Vref is applied to the other input of comparator 70. A transistor 72 has its collector connected to the first input of comparator 70. A one-shot multivibrator 74 receives the output of comparator 70. A short pulsed output of one-shot multivibrator 74 is applied to the base of transistor 72 to short circuit and discharge capacitor 68, while providing an output to a transmitter 76. The reference voltage Vref establishes the threshold voltage level at which one-shot multivibrator 74 is triggered. The time require to charge capacitor 68 to a voltage equal to Vref depends on the resistance of force-variable resistor 67. This charge time is thus also inversely related to the applied force. Accordingly, the pulse repetition frequency of pulses generated by pedal force measurement 62 is directly related, in a known manner, to the applied pedal force.

Recharging of capacitor 68 begins immediately after one-shot multivibrator 74 completes its output cycle, thereby cutting off transistor 72. With a pulse rate variable between about 50 and 500 Hz, a pulse duration of one-shot multivibrator 74 of less than about 2 milliseconds is required. In the preferred embodiment, a pulse duration of about 200 microseconds or less is believed to be satisfactory.

The pulsed signal, having a force-variable period t, is transmitted by transmitter 76 to a receiver 78 on a non-rotating part of the bicycle system. The output of receiver 78, either an analog or a digital signal, is applied to a plus input of an adder 80. In the preferred embodiment, the output of receiver 78 is varying DC signal having an amplitude variable with the pulse repetition frequency of the signal it receives from transmitter 76. Since every transmitted pulse has a fixed length, every pulse, when detected, contains the same amount of energy. Thus, the total energy transmitted is linearly proportional to the pulse repetition frequency. One simple way of producing a suitable varying DC signal includes integration in an integrator (not shown), in receiver 78, of the detected signal. The time constant of integration should be short with respect to a pedal cycle, but relatively long relative to an anticipated pulse repetition frequency. These relationships ensure that the DC output of receiver 78 closely follows the exerted pedal force.

A set-point voltage Vsp is applied to the minus input of adder 80.

The set-point voltage Vsp is generated at a boost threshold variable resistor 81. Operation of variable resistor 81 selects the pedal force at which boost is first applied.

The output of adder 80 is applied to a series combination of a boost maximum variable resistor 82 and a fixed resistor 83. The wiper of variable resistor 82 is connected to an input of an operational amplifier 84. A feedback resistor 86 is connected between the output and input of operational amplifier 84. The ratio of resistances of resistor 84 to the effective resistance of resistors 82 and 83 sets the gain of operational amplifier 84, and thus establishes the slope of the boost applied to a motor control 88. That is, the gain G of operational amplifier 84 is:

$$G = R84/(R82+R83)$$

The variability of the resistance in the denominator of the above equation permits setting the gain at a desired value. This settability is utilized in a manner to be described.

In response to the signal from operational amplifier 84, motor control 88 produces a drive signal for application to driving motor 40.

Motor control 88 may take any convenient form to provide an output that is variable in relationship to the pedal force and to adjustment settings. In the preferred embodiment, motor control 88 is a conventional device such as, for example, a motor control device manufactured by Curtis Instrument Corporation of Mount Kisco N.Y., produces a pulse-width-modulated (PWM) signal whose pulse width, and consequently whose contained power, varies in response to its inputs. Other types of control devices employing, for example, analog output or pulse repetition frequency or synthesized variable AC output may be employed.

Motor control 88 monitors the fraction of the total available power that is being commanded at any time and, when the commanded power approaches the maximum available power (duty ratio of, for example, 80 or 90 percent), motor control 88 applies a shift-down alarm signal to a shift-down indicator 90. Shift-down indicator 90 operates a visual and/or audible alarm to alert the rider to the need to shift into a lower gear. The maximum available boost power is set by the rider, as will be explained, at a value beyond which the rider is unwilling to exert. Thus, each time the riding conditions reach a combination which the boost system is incapable of accommodating, the system informs the rider that a down-shift is desirable.

In addition to informing the rider of the need for a down-shift, the system may include an advisory to increase the gearing when the riding conditions indicate. For example, if a number n pedal strokes is detected during which no boost power is required, an up-shift may be advised.

Transmission of force-related signals from rotating to non-rotating elements may be performed using any convenient technology. The radio transmission assumed in the embodiment of FIG. 5 is convenient considering that the distances involved are on the order of from about three to, at most, about 6 feet. A conventional garage-door opener transmitter, or an automotive system security transmitter, have ranges of, in most cases, about 100 feet. These devices have an output power on the order of about 100 milliwatts. Radio propagation is generally characterized by a square law. That is, in order to double the range, the power must be multiplied by four. Reversing this, the same output power capable of operating a garage door opener or a security system at 100 feet requires a transmitter power output of less than 10 milliwatts. Even in continuous service, a continuous drain of 10 milliwatts implies a battery life approximately equal to the battery shelf life. Of course, continuous operation is not necessarily contemplated, thus a very long life for relatively small-capacity batteries is foreseen for the battery source feeding pedal force measurement 62.

Referring now to FIG. 6, another technique for radio transmission includes a voltage-controlled oscillator (VCO) having an output frequency which is variable in response to the voltage it receives from pedal force measurement 62. The resulting variable-frequency signal is transmitted to a receiver 94. A variable-frequency detected output from receiver 94 is applied to an input of a frequency-to-voltage converter 96. The output of frequency-to-voltage detector 96 is a varying DC voltage which closely follows pedal force, as in the preceding embodiment.

Another possibility includes transmitting a signal having a force-variable amplitude. If the amplitude is the amplitude of modulation imposed on a carrier signal, this may be a suitable medium. The amplitude may, instead, be the amplitude of the transmitted radio frequency. This technique may be less than optimum due to the changing geometry and changing path attenuation in the anticipated operating environment.

Besides radio transmission, other suitable transmission techniques are considered to fall within the spirit and scope of the invention. For example, acoustic transmission, preferable ultra-sound above about 18 kHz, may be used. Optical transmission and magnetic transmission are further possibilities. The details of all such techniques would be clear to one skilled in the art having the present disclosure for reference.

Figure 7:
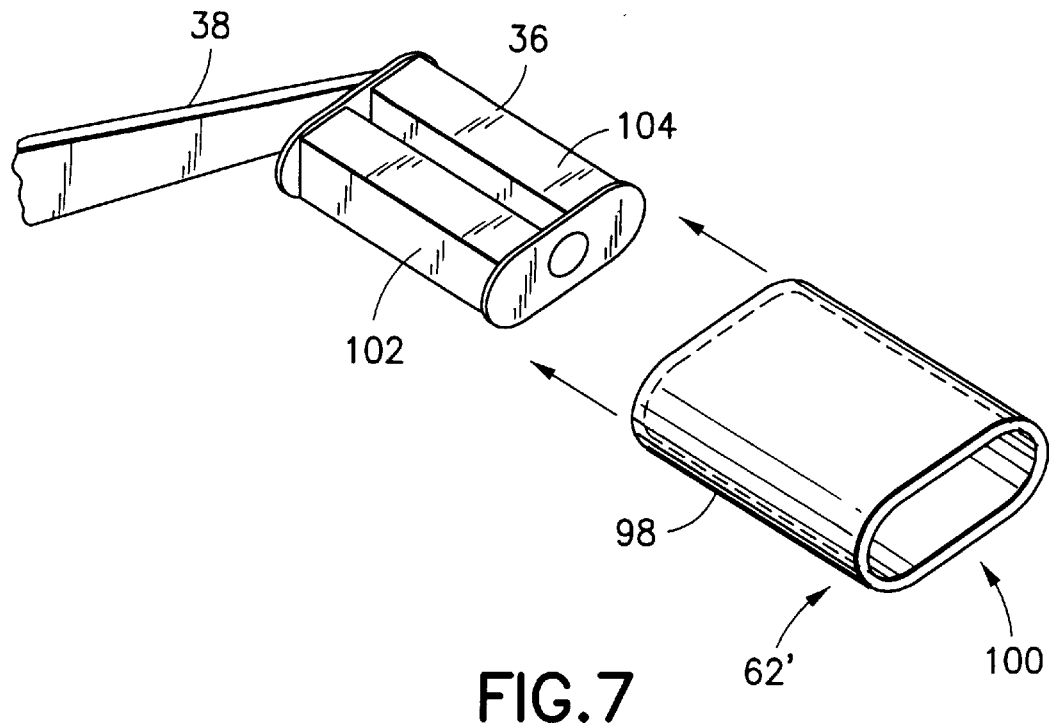
FIG. 7 is a perspective view of one type of pedal force sensor useful in practicing the invention.

Referring now to FIG. 7, one embodiment of a pedal force measurement 62' employs a force-variable resistor in the form of a loadcell cuff 98 sized to slip over pedal 36. An electronics assembly 100, containing circuits of the type described in the foregoing, is affixed at an end of loadcell cuff 98. As the rider's foot compresses the conductive rubber in loadcell cuff 98, the resulting change in resistance controls the force-variable characteristic of the transmitted signal.

Pedal 36 conventionally includes first and second rubber bars 102 and 104 against which the rider applies pedaling force. Rubber bars 102 and 104 are threaded onto metal bars, not shown, running through axial holes. Pedal force applied to the exterior of loadcell cuff 98 compresses the conductive rubber in loadcell cuff 98 against rubber bars 102 and 104, thereby producing the desired force-variability of resistance.

A further possibility for pedal force measurement 62 includes forming rubber bars 102 and 104 from conductive rubber, and using the force-variable electrical resistance for pedal force measurement 62. This eliminates the need for loadcell cuff 98.

Figure 8:
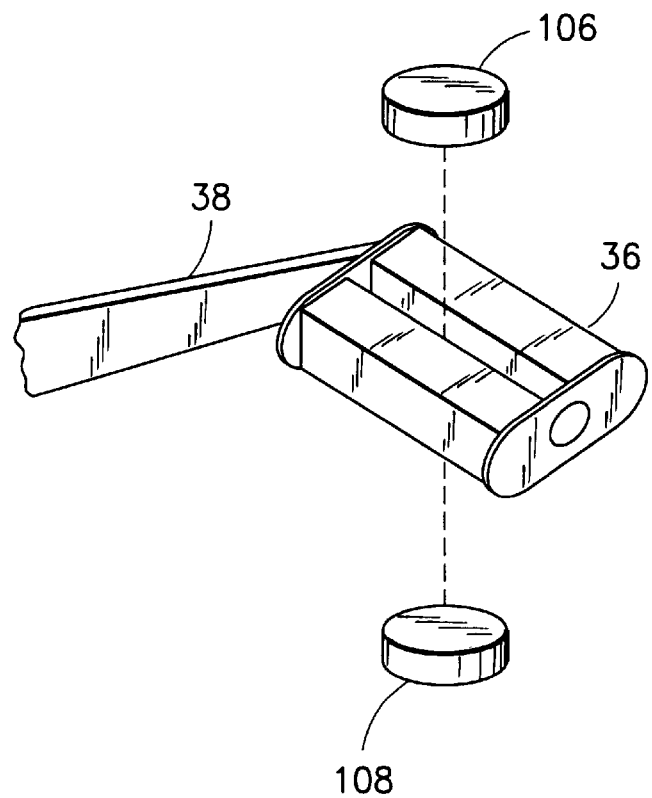
FIG. 8 is a perspective view of a second type of pedal force sensor useful in practicing the invention.

Referring now to FIG. 8, a further embodiment of pedal force measurement 62 include at least one autonomous pedal force measurement button 106 affixed on one surface of pedal 36. Button 106 contains the conductive rubber, pulse generator and power source (battery) as described above. A second button 108 may be required on the opposite side of pedal 36 so that, when a rider mounts the bicycle, one of buttons 106 and 108 will necessarily be turned to face the rider's foot. Each of buttons 106 and 108 preferably includes an OFF switch responsive to lack of foot pressure. This ensures that only the one of buttons 106 and 108 contacted by the foot of the rider is enabled to generate pulses. Whenever foot pressure is absent, battery power dissipation is zero.

The preferred embodiment of the invention proposes that pedal force monitoring be available from both pedals. Thus, a total of four buttons may be required. This may raise a cost problem. However, certain pedal designs such as, for example, the conventional bear-claw pedal, require the rider's foot to contact the same side each time. This reduces the total number of buttons to only two.

A plate (not shown) of metal or plastic may be affixed to the surface of buttons 106 and 108 to enlarge the area of contact with the rider's foot. This tends to distribute the force on the rider's foot without reducing the compression force on buttons 106 and 108.

Instead of a directly pressed sensor on pedal 36 (FIG. 1), a conventional strain gauge 109 (not shown) may be affixed to each pedal crank 38. As is well known, a strain gauge produces or controls an electrical signal varying in response to the amount of strain existing in the element to which it is affixed. The signal from strain gauges 109 are employed to control the generation of the pedal-force signal discussed in the preceding. Force-dependent signals from strain gauges 109 are transmitted from the rotating to non-rotating portions as previously described.

Figure 9:
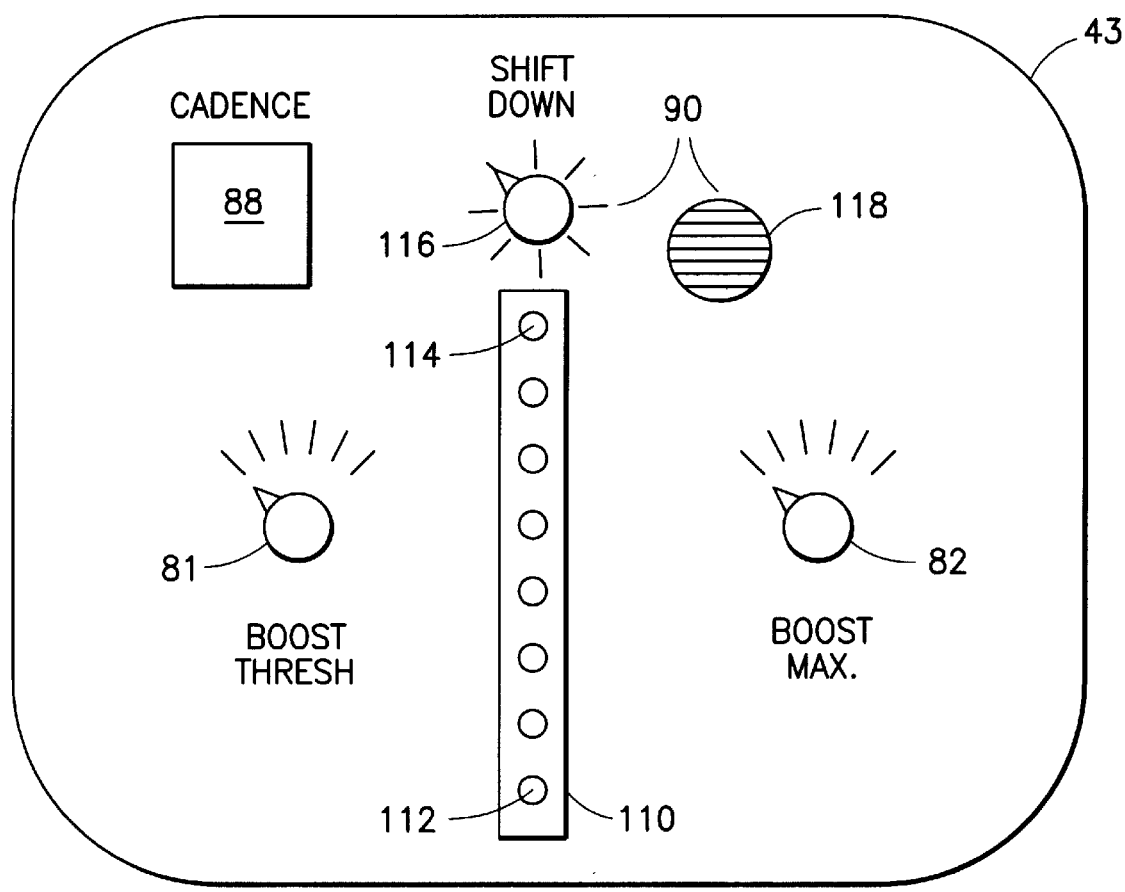
FIG. 9 is a front view of a control console useful for controlling the control system according to an embodiment of the invention.

Referring now to FIG. 9, control console 43 includes knobs for adjusting boost threshold control 81 and boost maximum control 82, as previously described. In addition, a boost output meter 110, consisting of sequentially illuminated light-emitting diodes 112 (LEDs), indicates the amount of boost actually being delivered at any time. That is, the highest one of LEDs 112 being illuminated at any instant indicates the portion of available boost actually being delivered. When the top LED 114 is illuminated, the system is producing all of the boost output of which it is capable. Whenever top LED 114 is illuminated, shift-down indicator 90 is energized to inform the rider, using a lamp 116 or an acoustic sounder 118, that the system has reached its upper limit in the selected gear, and it is time to shift to a lower gear.

A cadence readout 120, derived from the cyclic input to motor control 88, informs the rider about the number of pedal strokes per minute being accomplished. This guides the rider in balancing pedal force and cadence. Cadence readout 120 may be generated in the manner described in my prior U.S. Pat. No. 4,526,036, the disclosure of which is herein incorporated by reference.

The inventor foresees the following way of operating the system described using the controls, indicators and alarms of FIG. 9.

1. On level ground, the rider establishes a comfortable riding condition, with a cadence and pedal force that the rider can sustain more or less indefinitely.
2. The rider adjusts boost threshold control 81 until the lowest LED 112 just illuminates during the maximum force portion of the pedal stroke.
3. The rider backs off boost threshold control 81 until lowest LED 112 remains extinguished during the comfortable riding condition. Under this setting, as long as the riding conditions remain unchanged, no boost is applied.
4. The rider applies the maximum pedal force that the rider is willing to apply during riding. This may require waiting until a hill is to be climbed. p1 5. While maintaining the above maximum pedal force, the rider adjusts boost maximum control 82 until top LED 114 is illuminated and/or shift alarm 90 is energized at the peak of the pedal-force input.

With the adjustments described above, whenever the rider is forced to apply a pedal force exceeding the comfortable riding condition, the system begins augmenting power to the bicycle. The amount of auxiliary power added increases as the pedal force increases above the comfortable riding condition. The rate, or slope, of the added auxiliary power depends on the setting of maximum boost control 82.

In some embodiments of the invention, it may be desirable to adjust threshold and boost independently for left and right pedals. This may be desirable to accommodate the usual difference in left-right leg strength, or to compensate for different characteristics of the pedal-mounted components. The left and right signals may be separately received by transmitting left and right signals on different frequencies, or using any other conventional technique.

Figure 10:
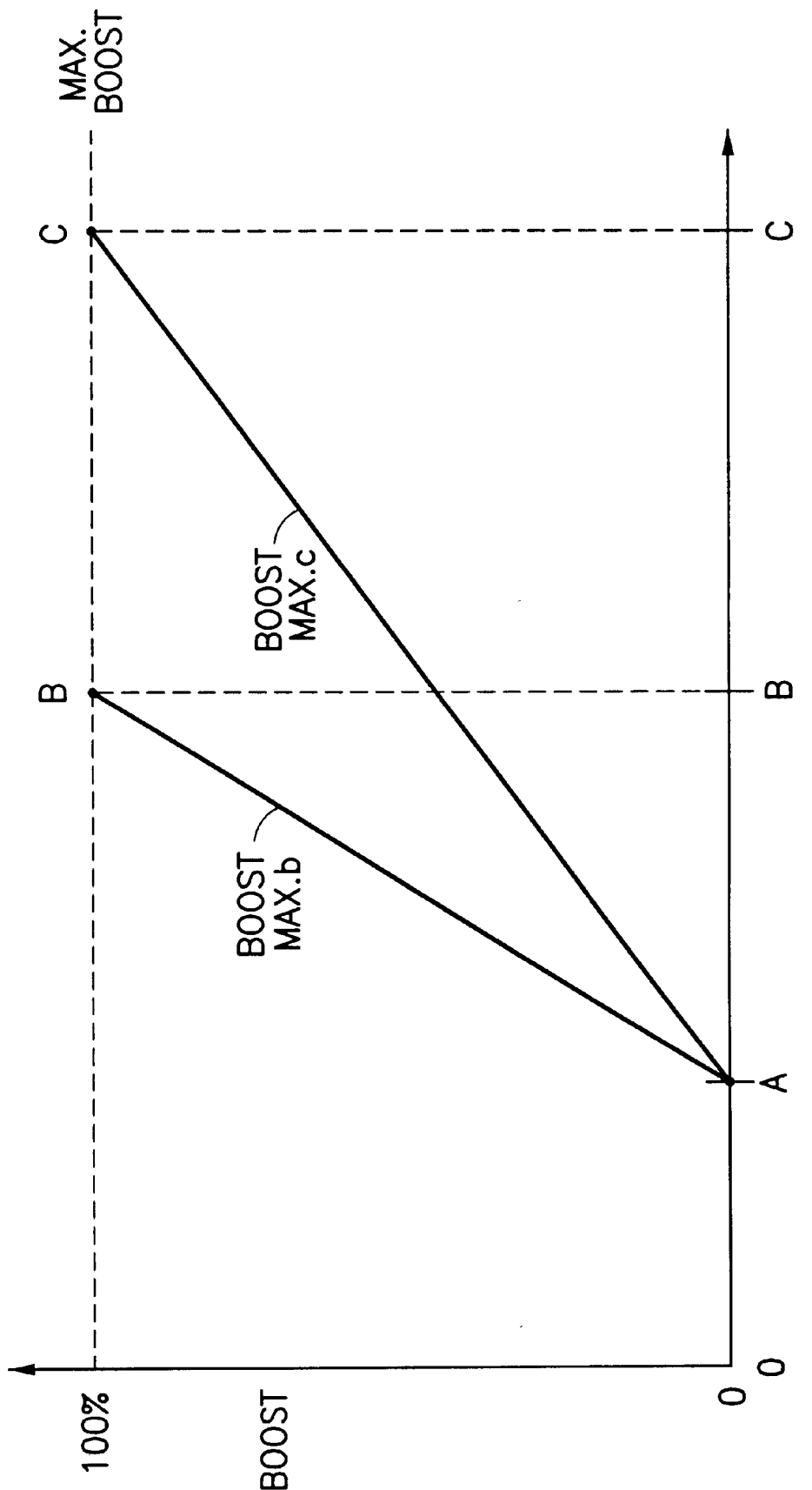
FIG. 10 is a set of curves to which reference will be made in describing the control system of the present invention.

Referring now to FIG. 10, the relationships between the pedal force, boost, and the settings of boost threshold control 81 and boost maximum control 82 is illustrated. Point A is assumed to be the pedal force defined in steps 1 and 2 above. Point B is one alternative selected in steps 4 and 5 above. The applied boost power is then related to the curve AB. Point C is another alternative selected in steps 4 and 5 in which the rider has a greater tolerance for maximum pedal force requirements. The applied boost power is then related to the curve AC. The human-power exertion at point A along the zero line is a settable value determined by the human output at which the rider desires to initiate boost. Point B is selected by a rider who opts to exert no more than a relatively low maximum pedal force, whereas, point C is selected by a rider who opts to exert a significantly higher maximum pedal force.

One skilled in the art will recognize that other values for point A may be selected along the horizontal axis. The values of points B and C may be the same as, or may have different values from, the values illustrated.

It is believed that, once the settings for boost threshold control 81 and boost maximum control 82 are made, these same settings may be retained for other portions of a ride, or for rides at later times, independently of changing slope, rider weight, wind speed and tire inflation pressure.

Instead of the rotary control shown for boost threshold control 81 and boost maximum control 82, these controls may be implemented as pushbuttons which set corresponding values in motor control 88. Also, if independent setting for left/right pedal forces are required, the threshold and maximum controls may be duplicated.

The foregoing embodiments place a substantial portion of the intelligence of the system on the non-rotating components. Referring now to FIGS. 11A and 11B, a further embodiment in shown wherein essentially all of the system intelligence is located on the pedal, with minimal intelligence required on the non-rotating components. A sawtooth generator 120, on an on-pedal assembly 122, feeds a sawtooth waveform to one input of a comparator 124. The other input of comparator 124 receives a voltage from a junction 125 of a fixed resistor 126 and a force-variable resistor 128. A voltage V is applied to the opposite end of fixed resistor 126. The opposite end of force-variable resistor 128 is connected to ground. The output of comparator 124 is connected to an input of a transmitter 130. Transmitter 130 is of a conventional type which applies a signal to an antenna 132 only in response to an enable signal at its input from comparator 124, and remains quiescent at all other times. Thus, transmitter 130 is a pulse transmitter effective to produce a series of output pulses having pulse widths that are proportional to the pedal force applied to force-variable resistor 128.

The voltage at junction 125 is reduced in proportion to the force applied to force-variable resistor 128.

Figure 12:
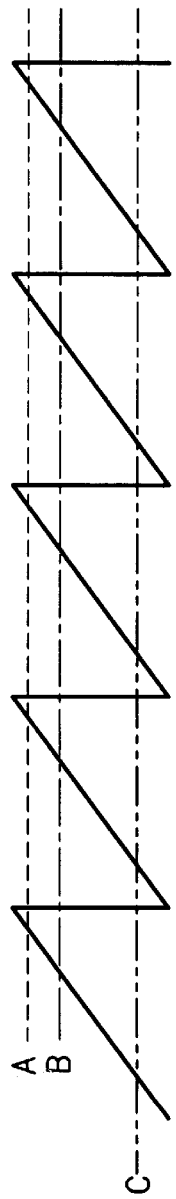
FIGS. 12 and 12A–12C are curves to which reference will be made in explaining the operation of the embodiment of FIGS. 11A and 11B.
Figure 12A:
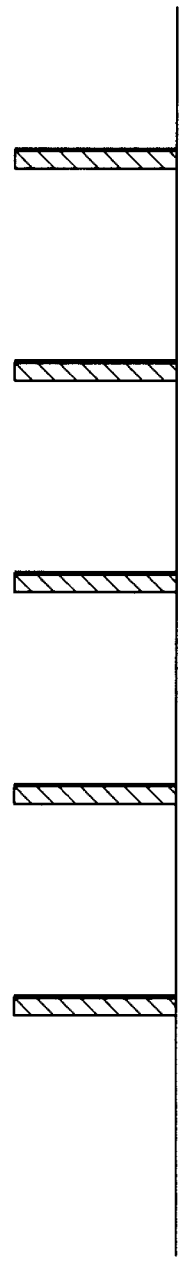

Referring now also to FIG. 12, the sawtooth-shaped waveform from sawtooth generator 120 is compared to the voltage at junction 125. With a small force applied, this voltage is a relatively high value such as shown in dashed line at A. Referring now also to FIG. 12A, during the times that the sawtooth amplitude exceeds voltage A, a pulse-type transmitted signal, shown hatched, is transmitted from on-pedal assembly 122.

Figure 12B:
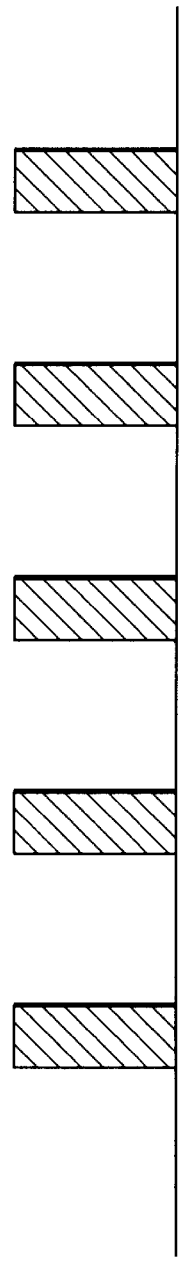
Figure 12C:
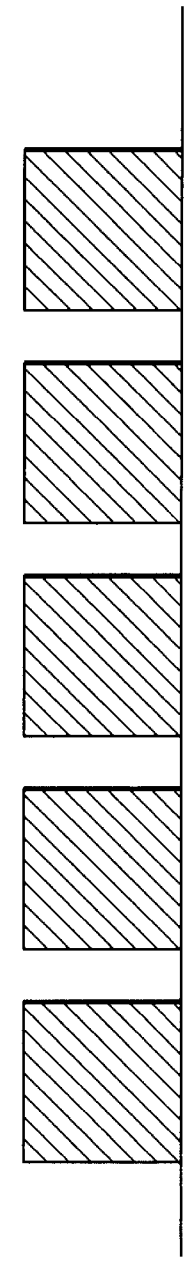

Returning to FIG. 12, successive increases in pedal force, such as illustrated in dash-dot line B, and dash-double-dot line C, produce the longer pulse outputs shown an FIGS. 12B and 12C, respectively.

Returning now to FIG. 11B, the signal received on an antenna 134 on a non-rotating portion 136 of the vehicle, is applied to an input of a receiver 138. Receiver 138 is of a conventional type which produces an enable output during the time that it receives a pulse input, and remains quiescent at all other times. The output of receiver 138 is applied to one input of a switch 140. The other input of switch 140 receives a battery output. The output of switch 140 is applied to drive motor 40. Switch 140 is closed between the battery input and drive motor 40 in response to enable inputs from receiver 138. Thus, drive motor 40 receives a pulsed signal having a fixed repetition rate, but having a pulse width (and duty ratio) that is proportional to the force applied to force-variable resistor 128. In this manner, the total energy applied to drive motor 40 is proportional to the pedal force.

It will be clear to one skilled in the art that the embodiment of the invention shown in FIGS. 11A and 11B substantially simplifies the equipment on non-rotating portion 136, without grossly complicating the equipment on on-pedal assembly 122.

In a further embodiment of the invention (not shown), an on-pedal pulse generator produces pulses of fixed width but with a repetition frequency that increases with increasing pedal force. In this embodiment, the off-pedal apparatus may remain a simple receiver/switch combination shown in FIG. 11B. The increasing pulse frequency produces a greater duty ratio (the ratio of ON time to total time), and thereby modulates the application of battery power in the same manner as the variable-width pulses of FIG. 11A.

In the embodiments of FIGS. 11A and 11B, substantially all of the control system is in the pedal-mounted components, which reduces the complexity of the off-pedal components to a basic receiver and switch.

The threshold and slope control, described above as electronic adjustments, can be readily accomplished in on-pedal components in a mechanical manner without departing from the spirit and scope of the invention. For example, thresholding can be performed using a spring which controls the amount of force required to compress a force-variable resistor sufficiently to attain a characteristic required to initiate boost. In one embodiment, a coil spring is adjustable to resist pedal force, thereby adjusting the amount of pedal force required to attain a predetermined change in resistance. Similarly, the boost slope can be adjusted by spring force, or other adjustable means, to change the amount of change in pedal force required to produce a unit change in resistance.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power augmentation system for a pedal-powered vehicle, comprising:

means for generating a force-dependent signal having a variable characteristic responsive to a pedal force applied to at least one pedal of said vehicle;

a control system;

said control system including means for producing a motor-control signal in response to said force-dependent signal;

said motor-control signal being adapted for applying a variable amount of electric power to a motor;

said variable amount being related to said variable characteristic;

first controllable means for setting a lower threshold below which said variable characteristic is ineffective for applying said electric power to said motor; and second controllable means for controlling a slope of said variable amount above said lower threshold, whereby said variable amount is a boost power controllably related to an amount by which said pedal force exceeds a value sufficient to achieve said lower threshold.

2. A power augmentation system according to claim 2, further comprising means for indicating to a rider a condition of said boost power at which an action by said rider is appropriate.

3. A power augmentation system according to claim 2 wherein said action includes at least one of a gear downshift and a gear upshift.

4. A power augmentation system according to claim 2 wherein:

said condition includes a predetermined fraction of a maximum of said boost power; and said action includes selection of a lower gear.

5. A power augmentation system for a pedal-powered vehicle comprising:

a force-variable element on at least one pedal of said vehicle;

said force-variable element being positioned to be contacted by a foot of a rider of said vehicle during pedaling;

means on said pedal for producing a force signal in response to a pedal force applied by said foot to said force-variable element;

means for transmitting said signal to a receiver on a non-rotating portion of said vehicle;

a drive motor; and means for applying a motor drive power to said motor in proportion to said signal received by said receiver.

6. A power-augmentation system according to claim 5, further comprising means responsive to a time variation in said signal for indicating a pedaling cadence.

7. A power-augmentation system for a pedal-powered vehicle comprising:

a force-variable element on at least one pedal of said vehicle;

said force-variable element being positioned to be contacted by a foot of a rider of said vehicle during pedaling;

means on said pedal for producing a signal in response to a pedal force applied by said foot to said force-variable element;

means for transmitting said signal to receiver on a non-rotating portion of said vehicle;

a drive motor;

means for applying a motor drive power to said motor in proportion to said signal received by said receiver;

said force-variable element includes a force-variable resistor;

said means on said pedal includes a pulse generator feeding pulses to a radio transmitter;

said pulse generator being responsive to a voltage varied by passage through said force-variable resistor to produce pulses having at least one of a pulse width, a transmission frequency and a pulse repetition frequency related to said voltage, whereby said signal is responsive to said pedal force.

8. A power-augmentation system according to claim 7, wherein:

said means for applying a motor drive power includes means for applying a pulse signal to said motor; and said pulse signal being variable in at least one of a pulse width and a pulse repetition frequency, whereby a power content of said pulse signal is responsive to said signal.

* * * * *